United States Patent
Cherukumudi et al.

(10) Patent No.: US 8,185,501 B1
(45) Date of Patent: May 22, 2012

(54) CONDITIONAL FRACTIONAL DATA STORE REPLICATION

(75) Inventors: Vijaykumar Cherukumudi, Overland Park, KS (US); David K. Fultz, Raymore, MO (US); Nadirshah N. Jivani, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 192 days.

(21) Appl. No.: 12/719,724

(22) Filed: Mar. 8, 2010

(51) Int. Cl.
*G06F 17/00* (2006.01)
(52) U.S. Cl. ........ 707/647; 707/610; 707/640; 707/661; 707/674; 707/822; 707/641; 707/642; 707/643; 707/644; 707/654; 707/655; 707/659
(58) Field of Classification Search .................. 707/610, 707/640, 641, 642, 643, 644, 647, 654, 655, 707/659, 661, 674, 822, 999.204
See application file for complete search history.

(56) References Cited

U.S. PATENT DOCUMENTS

| | | | |
|---|---|---|---|
| 2003/0046589 A1* | 3/2003 | Gregg | 713/201 |
| 2003/0126136 A1* | 7/2003 | Omoigui | 707/10 |
| 2004/0064502 A1* | 4/2004 | Yellepeddy et al. | 709/203 |

* cited by examiner

*Primary Examiner* — Syling Yen

(57) ABSTRACT

A computer implemented method for providing enhanced customer support is provided. The method comprises a replication server selecting a plurality of first entries in a source lightweight directory access protocol (LDAP) data store based on at least one attribute of the selected entries matching a predefined criteria, wherein a structure of the first entries is defined by a first schema. The method also comprises the replication server copying a plurality of attributes of each of the selected entries into a target lightweight directory access protocol data store, wherein the target lightweight directory access protocol data store contains a plurality of second entries, wherein a structure of the second entries is defined by a second schema, wherein the first schema is different from the second schema, and wherein the plurality of attributes copied do not include all of the attributes defined by the first schema.

15 Claims, 6 Drawing Sheets

CONDITIONAL FRACTIONAL DATA STORE REPLICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Directory services are information infrastructures for locating, administering, and organizing common data objects representing users, groups, files, folders, computers, and printers on a computer network. Directory services map the names of resources and other objects to physical addresses on a network and may promote convenience in locating resources. Objects in a directory service may be organized in a hierarchical database structure. Users, groups, and resources are stored as objects and information about the objects is stored as attributes in schemas. Objects are described in classes with attributes providing specific information about objects such as name and primary characteristics. Directory services have evolved to be readily accessible by various tools using computing protocols, for example the lightweight directory access protocol (LDAP), based on the transmission control protocol, internet protocol (TCP/IP) suite of networking protocols. The lightweight directory access protocol is an application protocol that may be used for querying and modifying directory services. Numerous vendors have developed proprietary directory services database implementations based on these protocols.

SUMMARY

In an embodiment, a computer implemented method for enhanced customer support is provided. The method comprises a replication server selecting a plurality of first entries in a source lightweight directory access protocol (LDAP) data store based on at least one attribute of the selected entries matching a predefined criteria, wherein a structure of the first entries is defined by a first schema. The method also comprises the replication server copying a plurality of attributes of each of the selected entries into a target lightweight directory access protocol data store, wherein the target lightweight directory access protocol data store contains a plurality of second entries, wherein a structure of the second entries is defined by a second schema, wherein the first schema is different from the second schema, wherein the plurality of attributes copied do not include all of the attributes defined by the first schema.

In an embodiment, a system is provided. The system comprises a computer, a memory, a first lightweight directory access protocol (LDAP) data store, a second lightweight directory access protocol data store, and an application stored in the memory. When executed by the computer, the application selects a plurality of first entries in the first lightweight directory access protocol data store based on at least one attribute of the selected entries matching a predefined criteria, wherein a structure of the first entries is defined by a first schema and copies a plurality of attributes of each of the selected entries into the second lightweight directory access protocol data store, wherein the second lightweight directory access protocol data store contains a plurality of second entries, wherein a structure of the second entries is defined by a second schema, wherein the first schema is different from the second schema, and wherein the plurality of attributes copied do not include all of the attributes defined by the first schema.

In an embodiment, a computer implemented method is provided. The method comprises selecting a plurality of entries in a first data store that satisfy a predefined condition. The method also comprises copying a portion of the selected entries to a second data store, wherein the second data store comprises a plurality of entries associated with customer communication services accounts. The method also comprises authenticating a login to an application based on the copied portion of one of the selected entries in the second data store to establish an application session. The method also comprises authorizing the application session to execute in a context of a customer communication services account defined by one of the entries in the second data store. The method also comprises the application session identifying a communication problem experienced by the customer communication services account defined by the one of the entries in the second data store. The method also comprises fixing the identified communication problem.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
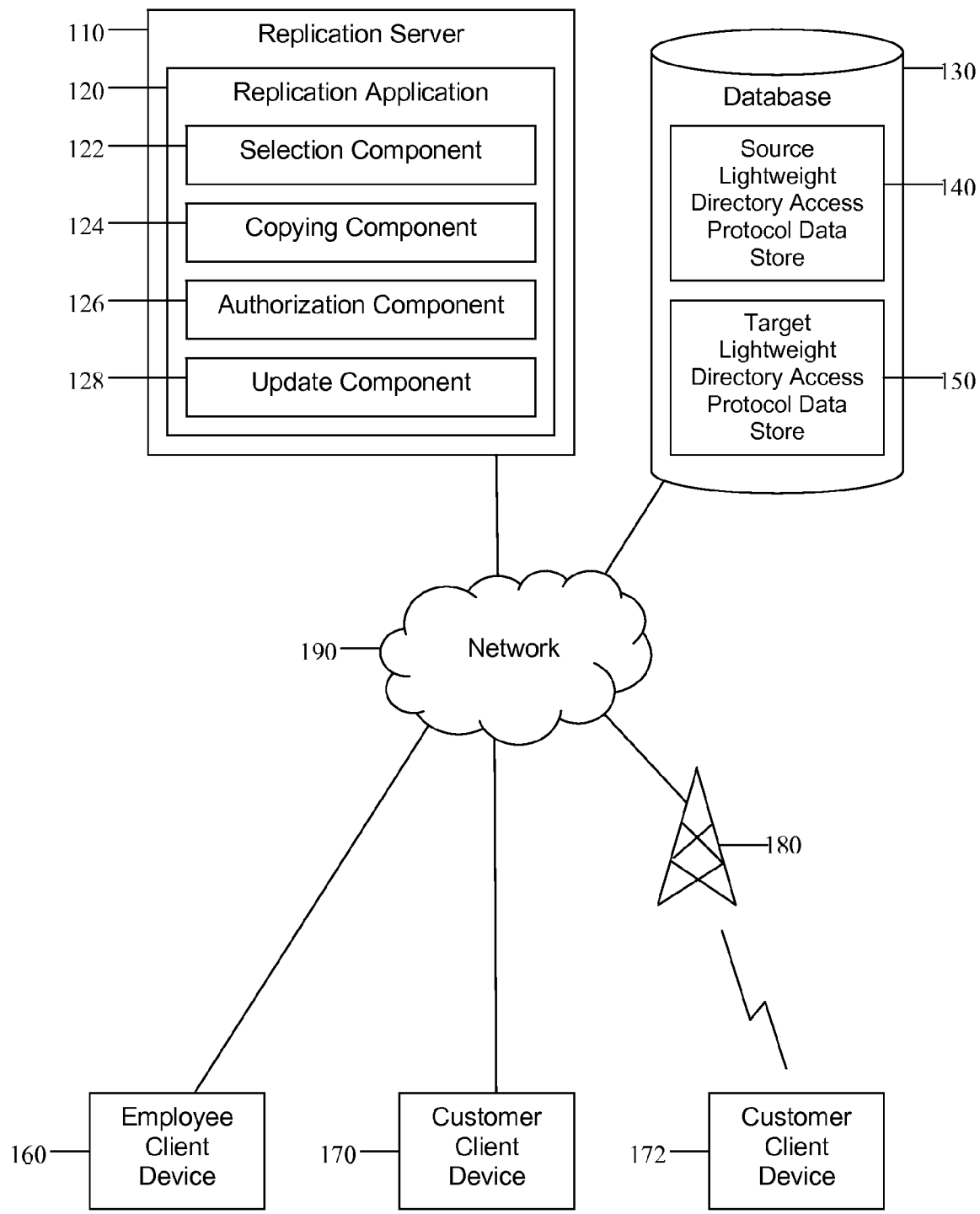
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches the conditional selection of entries from a source lightweight directory access protocol data store for fractional replication to a target lightweight directory access protocol data store based on at least one attribute of the selected entries meeting a predefined criterion. Conditionally selected entries are replicated with a fraction of the entries' attributes copied into the target data store. In an embodiment, users associated with the replicated entries may then mimic users with user entries in the target data store to observe and resolve problems experienced by the mimicked users. Replication causes some credentials and tokens to flow from the source to the target data store permitting a limited authentication there. Users replicated from the source data store authenticate in the contexts of users in the target data store with limited privileges and data access to directly experience the problems experienced by users executing in the context of the target data store. This may permit a more expedient and effective resolution of problems experienced by users in the target data store.

A telecommunications services provider or other organization may serve a body of customers with user accounts stored in a customer lightweight directory access protocol data store. The organization may employ a plurality of customer service representatives with user accounts stored in an employee lightweight directory access protocol data store. Database entries associated with employee accounts in the employee data store may be defined by a different schema than database entries for customer accounts in the customer data store. When a customer reports a problem with an application or other aspect of service provided by the organization, an employee, for example a customer service representative, may wish to directly observe the problem experienced by the customer. While authenticated and resident only in the employee directory, the employee may be unable to observe or recreate the customer's problem. The employee's effectiveness in assisting the customer may be limited by this inability.

A replication application is taught that, in the example, may search the employee lightweight directory access protocol data store for directory entries that contain an attribute for employee role. When that condition is met, a further condition is applied stipulating that the employee role attribute has a value of customer service representative. When the conditions are met, the entries are selected and copied with limited or fractional attributes into the customer lightweight directory access protocol data store. The attributes selected for replication may be limited to those that enable customer service representatives to authenticate on a restricted basis in customer contexts within the organization's directory data store. Customer service representatives authenticated in their customers' contexts may then mimic the customers using the customers' application and other settings to experience and observe reported problems from the customers' perspective.

Replicating only selected entries and a limited set of attributes from the employee data store may enable the assisting employee to effectively serve the customer while protecting the customer's privacy and data security. The present disclosure also teaches several methods of updating replicated entries previously stored in the target data store to deal with changes to attributes of the replicated entries. Changes to attributes for some replicated entries may result in the removal of the replicated entries from the target data store.

Turning now to FIG. 1, a system 100 of conditional fractional lightweight directory access protocol data store replication is described. The system 100 comprises a replication server 110, a replication application 120, a database 130, a source lightweight directory access protocol data store 140, a target lightweight directory access protocol data store 150, an employee client device 160, customer client devices 170, 172, a base transceiver station 180, and a network 190.

The terms source lightweight directory access protocol data store 140 and source data store 140 refer to the same component and may be used interchangeably herein. The terms target lightweight directory access protocol data store 150 and target data store 150 refer to the same component and may be used interchangeably herein.

The replication server 110 may be implemented by a computer system. Computer systems are discussed in greater detail hereinafter. The replication application 120 executes on the replication server 110 and conditionally replicates fractional portions of entries from the source lightweight directory access protocol data store 140 to the target lightweight directory access protocol data store 150. The replication application 120 searches the source data store 140 and selects entries exhibiting at least one attribute that matches at least one predefined condition. Entries with the attribute that meets the condition are then replicated with a fraction of their full attribute set to the target data store 150. Users associated with the replicated entries may authenticate in the target data store 150 with limited privileges and access. The users may mimic users executing in the context of the target data store 150 to observe, diagnose, and resolve problems experienced by those users.

The replication application 120 copies a portion of each entry that meets the predefined condition and/or conditions, the copied portion comprising a fraction of its attributes, into the target data store 150. The copied entry may comprise only the attributes needed for the associated user to mimic the user in the target data store 150 and to recreate the problem from the affected user's perspective. The limited attributes associated with the replicated entry allow the assisting user to effectively authenticate and be cloaked in the identity of the affected user. The assisting user authenticates in the affected user's directory services context and assumes a limited scope of the affected user's rights and privileges.

The replication application 120 may replicate a plurality of entries from the source data store 140 with the at least one attribute that meets the predefined criteria. The replicated entries may remain in the target data store 150. When a user that executes primarily in the context of the source data store 140 whose entry was replicated to the target data store 150 logs in and authenticates, cookies, tokens, or certificates in that user's computer system may be activated to additionally permit execution in the context of the target data store 150. The user may be simultaneously authenticated in both the source data store 140 and in the target data store 150 on the limited basis taught herein.

In the example previously provided, a communications service provider may store data objects for users of its systems in a plurality of lightweight directory access protocol data stores running on databases in its enterprise. The provider may separately maintain an employee or source data store 140 for employees and maintain a customer or target data store 150 for customers. Customer service representatives employed by or contracted for by the provider, who may provide telephone or online assistance to customers, may typically be represented by user objects stored in the source data store 140. Customers of the communication services provider may typically be represented by user objects stored in the customer or target data store 150. Customers experiencing problems or questions with applications and other services may contact a customer service function and communicate with customer service representatives. Because the user accounts of employees, including customer service representatives, and those of customers are segregated in separate lightweight directory access protocol data stores, a customer service representative using his or her own account resident in the source data store 140 may be unable to experience first hand or "see" a problem as the customer is experiencing it. The present disclosure teaches the partial replication of some source data store 140 entries into the target data store 150 permitting the employees associated with the replicated entries to effectively be cloaked in the identity of the customer. The cloaked employee authenticates in the customer's context and may directly experience the application or service problem reported by the employee. This may permit the customer service representative to more correctly diagnose the problem and provide more expedient relief. Without such capability, the customer service representative may attempt to recreate the customer's problem in a laboratory setting that may be time consuming and produce results that are not reliable.

The replication application 120 may periodically update entries in the employee or source data store 140. When any such entries, that may be associated with customer service representatives in the example provided, have been partially replicated into the customer or target data store 150, attributes of the entries that have been replicated may periodically need to be updated in the target data store 150. The replication application 120 may perform these updates in a plurality of manners. The update process identifies the replicated attributes of entries and determines if any of the replicated attributes have changed and may therefore need to be updated in the target data store 150. When one of the replicated attributes changes, the replication application 120 copies the change into the attribute stored with the replicated entry in the target data store 150. If the change in the copied attribute results in the attribute no longer meeting the predefined criteria, this may cause the replication application 120 to remove the replicated entry from the target data store 150. This action may result in the customer service representative associated with the removed entry losing the ability to authenticate in the target data store 150 and mimic user accounts there.

FIG. 1 depicts the source lightweight directory access protocol data store 140 and the target lightweight directory access protocol data store 150 as stored on the database 130. In an embodiment, the source lightweight directory access protocol data store 140 and the target lightweight directory access protocol data store 150 may be stored on separate devices. In an embodiment, a plurality of instances or copies of each of the source lightweight directory access protocol data store 140 and the target lightweight directory access protocol data store 150 may be stored on separate devices in a plurality of geographic locations.

The employee client device 160 is a desktop computer or other electronic device used by a customer service representative in assisting a customer in resolving a problem experienced by the customer. The example described herein of a customer service representative employed by a communication services provider assisting a customer resolve a problem describes a single embodiment of the teachings of the present disclosure. The employee client device 160 may be any electronic device used by a party associated with a user object or other object stored in the source lightweight directory access protocol data store 140 whose entry is conditionally and fractionally replicated to the target lightweight directory access protocol data store 150. In implementations that differ from the example used, a different term than employee client device 160 may be used to describe this component.

The customer client devices 170, 172 are used by customers that may receive assistance from customer service representatives in the example provided herein. The customer client devices 170, 172 may be one of a desktop computer, a laptop computer, and a tablet computer. The customer client devices 170, 172 may also be a portable electronic device and may be one of mobile phone, a portable digital assistant (PDA), and a media player. The customer client devices 170, 172 may be any device used by a party associated with a user object or other object stored in the target lightweight directory access protocol data store 150 wherein the identity associated with the user object is mimicked or cloaked for the purpose of accomplishing customer service tasks on behalf of the user of the customer client devices 170, 172. In implementations that differ from the example used, a different term than customer client device 170, 172 may be used to describe this component.

The replication application 120 comprises the selection component 122 that may periodically examine a plurality of entries stored in the source lightweight directory access protocol data store 140. Each entry may comprise a set of attributes. Each attribute has a name and may have one or more values. A directory services database accessible using the lightweight directory access protocol may contain a plurality of entries for different objects, for example users, groups, servers, and printers. The present disclosure teaches the selection of entries primarily associated with users wherein the attributes that make up the entry may comprise, for example, the name of the user, telephone numbers and other contact information, work location, the name of the user's manager, and the user's role. The entry may contain an attribute called "user name" and the value of the attribute may be "John Doe." The entry may or may not contain an attribute for role. The present disclosure teaches the conditional selection of entries from the source data store 140 based first on the predefined criterion that the entry contains an attribute for role. The selection component 122 searches a body of entries in the source data store 140 for entries containing the role attribute.

The selection component 122 then applies a second criterion to the entries conditionally selected because they have the role attribute. In the example provided, the selection component 122 selects the entries wherein the role attribute is customer service representative. The selection component 122, in selecting entries from the source data store 140, may cause a post processing exit routine to activate after a group of lightweight directory access protocol data stores replicate. A plurality of lightweight directory access protocol data stores may replicate with each other in a multi-master arrangement. Some of the lightweight directory access protocol data stores may be dedicated to users submitting directory services requests. Other lightweight directory access protocol data stores may be used for operational purposes to handle tasks not directly related to user requests. One such task may be processing instructions to activate the post processing exit routines that perform the conditional and fractional selection of entries and attributes from the source data store 140 under the direction of the selection component 122. The post processing exit routine may be activated after a group of lightweight directory access protocol replicate with each other. The post processing exit routine captures the entries requested by the selection component 122. The post processing exit routine may implement a plurality of business rules, some of which are invoked by the selection component 122. The present disclosure teaches the implementation of a business rule to conditionally and fractionally replicate some entries from the source data store 140 to the target data store 150. The actions of the selection component 122 in invoking the post processing exit routine may take place on a replicated instance of the source data store 140 that is used for operational purposes instead of live directory services requests from users.

The conditional replication taught by the present disclosure may condition replication to the target data store 150 based on an entry in the source data store 140 comprising a role attribute wherein the role attribute has a value of customer service representative in the example provided. The selection component 122 may impose further conditions that the entry comprise other attributes in addition to the role attribute. The additional conditions may define one or more predefined values. For example, the selection component 122 may implement a criterion that an attribute named "region" is present in the entry and the attribute contain either a value of "Northwest" or "Middle Atlantic." These values may indicate geographic customer regions that a customer service representative may serve. Other customer regions may not receive the type of services taught by the present disclosure for business, technical, or other reasons. Entries comprising a role attribute with a value of customer service representative but not comprising the region attribute with a value of either Northwest or Middle Atlantic may not be selected, for example, for replication by the selection component 122. Further conditions for additional attributes and attribute values may be imposed by the selection component 122 before an entry may be selected for replication. The selection component 122 may, for example, additionally implement the criterion that an entry comprise an attribute for technical certification with the attribute containing a value of "Yes." Customer service representatives serving the Northwest or Middle Atlantic regions that have not earned technical certification would not be selected for replication by the selection component 122 in the example.

Entries resident in the source data store 140 meeting each of the conditions mandated by selection component 122 that may be imposed using a post processing exit routine, for example, are then subject to fractional replication. The present disclosure teaches a fractional instead of a full replication of attributes of entries conditionally selected for replication. When an entry has been selected for replication, i.e. it has been determined to comprise at least one attribute matching a predefined condition or criterion, the selection component 122 then determines the attributes of the selected entry that will be replicated to the target data store 150. The attributes selected for replication may not be the same attributes examined earlier in the conditioning stage to determine if the entry is to be replicated. For example, while the presence of a region attribute and a technical certification attribute and the presence of certain values for each attribute may have been conditions for selection, there may be no need for these attributes to be replicated to the target data store 150. The selection component 122 may select a small quantity of attributes to copy into the target data store 150, for example less than five attributes. The attributes selected may be authentication attributes and may comprise a userid attribute and a password attribute. The inclusion of these attributes may permit the customer service representative to be cloaked in the identity of the affected customer and work in the customer's stead without having to provide authentication beyond that needed to long into the customer service representative's home domain.

The actions of the selection component 122 have been described as a two stage process of conditional selection of entries from the source data store 140 followed by fractional selection of attributes of the conditionally selected entries. The conditionally selected entries comprising their fractionally selected attributes are passed on for replication to the target data store 150. As noted, the selection component 122 may enable a post processing exit routine to execute based on instructions provided by the selection component 122. The selection component 122 may use other methods to perform these tasks.

The replication application 120 may also comprise the copying component 124 that copies or replicates the fractional entries selected by the selection component 122 from the source lightweight directory access protocol data store 140 to the target lightweight directory access protocol data store 150. The target data store 150 in the example provided may comprise a plurality of entries for user accounts of customers of a communications service provider. These customer entries may be defined by a second schema that is different from a first schema that defines employee entries stored in the employee or source data store 140. The process of copying the selected entries to the target data store 150 may be accomplished in a variety of manners known to those skilled in the art. The process may involve the use of a publish/subscribe paradigm wherein the copying component 124 publishes or otherwise announces the availability of the selected entries. Components of the subscribing target data store 150 may retrieve the published entries under the direction of the copying component 124. By subscribing, the target data store 150 is registered to receive selected entries as published by the copying component 124. In an embodiment, the target data store 150 may be a durable subscriber wherein it receives copied entries even if a replication fails and the replication is required to start over from the beginning, at the point where the failure occurred, or at some other point. In an embodiment, delivery of replicated entries to the target data store 150 is persistent and entries selected for replication may reside in a persistence store (not shown) until the entries are determined to have successfully replicated to the target data store 150. When the publish/subscribe paradigm is in use by the copying component 124, the publishing of entries available for replication and the retrieval of them by the target data store 150 may be asynchronous. Components of the target data store 150 may not retrieve and store selected entries immediately upon the publishing of the entries. The entries may be retrieved at scheduled times unrelated to the times that entries are published. Retrieval times may be based on network load factors and other replication activities taking place on the enterprise network of the communications service provider.

The replication application 120 may also comprise the authorization component 126 that permits entries replicated into the target data store 150 to function in the context of the customer. After a customer service representative has been authenticated into his or her own home domain that may in part comprise directory services objects stored in the source data store 140, the customer service representative may then wish to assist a customer in the customer's domain that is associated with the source data store 140. The authorization component 126 may recognize that a user identification associated with the source data store 140 is attempting to perform actions in the customer's domain. The authorization component 126 may access the target data store 150 and determine that the user identification associated with the assisting customer service representative corresponds to an entry earlier replicated from the source data store 140. The authorization component 126 may determine from entries the identity of the customer that the customer service representative seeks to mimic and assist. Entries made by the customer service representative may also include or make reference to tokens, certificates, cookies, or credentials that the authorization component 126 may match with one or more attribute values previously stored in the target data store 150. The customer service representative may not have to enter his or her user identification or password to begin working in the customer's domain because authentication attributes were part of the entry that was earlier replicated into the target data store 150. The customer service representative may be placed in the context of the customer reporting a problem and may be effectively cloaked in the identity of the customer for purposes of observing the customer's reported problem.

The customer service representative, while working in the role of the customer in the customer's context, has limited functionality and may have significantly less functionality than when working in his or her own home domain. Because the customer service representative's entry from the source data store 140 is only fractionally copied to the customer or target data store 150, only the attributes necessary to assist the customer may be copied. The customer service representative may, for example, be unable to view some or any of the customer's stored data including saved documents, address books, contact lists, calling records, and text messaging records. The present disclosure teaches protections of the customer's privacy and data security by providing the customer service representative with limited access to a customer execution context to assist the customer in replicating and troubleshooting a problem reported by the customer. For example, in some cases, the customer service representative may be able to replicate and/or resolve the problem without needing to read or copy the customer's stored data. The customer service representative's access may be limited to a restricted set and/or class of applications that are stored in the customer client device 170, 172 or otherwise accessible to the customer. The authorization component 126 may permit the customer service representative to log into the restricted set of customer applications based on a replicated entry and may authorize the application sessions to execute in the context of the customer's account. This may permit the customer service representative to recreate the customer's reported problem. When the customer service representative is working in the customer's context in an application with which the customer has experienced problems, the customer service representative may also take on the application settings of the customer. When an employee ceases to have the customer service representative attribute, the directory entry for the employee is promptly removed from the target data store 150, denying the employee the ability to access directory entries for customers.

The replication application 120 also comprises the update component 128 that updates entries previously copied into the target data store 150. The update component 128 may also incrementally copy a single or several new entries to the target data store 150 when the role or other attributes changes and the entries qualify for replication. Attributes of entries in lightweight directory access protocol data stores are regularly updated for a plurality of reasons and lightweight directory access protocol data stores are replicated with each other on a regular basis. While the present disclosure teaches a multi-mastering lightweight directory access protocol topology, other topologies and replication practices may be employed. Replication periodically takes place between lightweight directory access protocol data stores that perform various tasks including handling customer requests, handling operational tasks, and serving other purposes. The present disclosure teaches at least some of the actions of the replication application 120 taking place on a lightweight directory access protocol multi-mastered host dedicated to operational tasks. These actions may include implementing various post processing exit routines to perform conditional and fractional selection of entries and publishing the selected entries as described earlier. The multi-mastered host may be the replication server 110 that is associated with the database 130 wherein the source data store 140 and the target data store 150 may reside. A plurality of other lightweight directory access protocol data stores throughout the organization may periodically replicate with both the source data store 140 and the target data store 150.

The update component 128 may perform updates in several manners. Updates may concern entries that have previously been copied from the source data store 140 to the target data store 150 wherein the replicated portions of the entries presently remain in the target data store 150. When a plurality of lightweight directory access protocol data stores across the organization replicate with each other, attributes for an entry that have been changed in one data store are replicated to the record for the entry stored in the other data stores. When replication between a plurality of lightweight directory access protocol data stores takes place and the source data store 140 receives replication, the update component 128 may examine changes to entries in the source data store 140. The update component 128 may specifically examine changes to entries and their attributes that have been conditionally and fractionally replicated to the target data store 150. When those entries were originally replicated a flag may have been set in the entries to alert the update component 128 to examine those entries whenever a replication from other lightweight directory access protocol data stores takes place.

The update component 128 examines the attributes of entries that were earlier examined by the selection component 122 to originally determine if the entry should be replicated. In the example used, the role attribute was first determined to be present and then it was determined if the value of the role attribute was customer service representative. Other attributes may also have been examined. The update component 128 examines those specific attributes of previously replicated entries to determine if any of the attributes have been deleted from the entries or if any values of the specific attributes have changed. If any of the attributes have been deleted or any values of the replicated attributes have changed, the update component 128 may apply rules to determine if the replicated entry should remain in the target data store 150. For example, the update component 128 may be alerted that several entries in the source data store 140 that were earlier replicated to the target data store 150 have been updated in some manner. The update component 128 may determine that the value of role attribute in several of the entries has been changed from customer service representative to some other value. Rules consulted by the update component 128 may dictate that those entries be removed from the target data store 150 because they no longer meet the original requirement of the selection component 122 that the value of the role attribute be customer service representative. In another example, the value of the role attribute may remain customer service representative but the region attribute for an entry may change from Northwest or Middle Atlantic to South Central, thus disqualifying the entry from its copied status in the target data store 150. In these cases, the replicated entries wherein these attributes have changed to values that are not permitted by the selection component 122 may be deleted from the target data store 150.

The update component 128 may replicate attribute changes to the target data store 150 regardless of the change. The replication coding sent to the target data store 150 may contain commands in addition to the attribute changes. The commands may direct that when an attribute such as role is deleted or the value of the attribute changes from customer service representative to some other value, the entry is to be deleted from the target data store 150. The update component 128 is effectively sending processing logic and commands with its updates. The update component 128 is effectively not performing updates in this example, rather it is permitting the processing logic sent to the target data store 150 to make decisions and issue commands there regarding attribute changes.

In some cases, attributes of replicated entries may change but the change does not cause the entry to be deleted from the target data store 150. In the example provided, a customer service representative may change regions from Northwest to Middle Atlantic. Since both regions are permitted, the entry is not deleted even though the value of the replicated attribute changed. In some cases, attributes that have been fractionally replicated may change but the change does not have an effect on the entry's replicated status no matter what the change. So long as an entry's role attribute remains customer service representative, it may not matter that the value for the level of the person's technical certification may change, for example. Some replicated attribute values may be required to remain static, such as role, while others, such as level of technical certification may be permitted to change, so long as the attribute change does not result in the attribute being deleted.

The update component 128 examines attributes of replicated entries wherein the attributes are those that were earlier qualified by the selection component 122 for replication to the target data store 150. When an attribute is either not one of the attributes originally examined by the selection component 122 for initial qualification for replication or not part of the fractional group of attributes then replicated to the target data store 150, changes to the attribute may be of no concern to the update component 128. The update component 128 is concerned with attributes that were involved in the initial qualification process by the selection component and/or those that were part of the replication. Attributes that fall outside of these two possibly overlapping sets of attributes may be disregarded by the update component 128.

The update component 128 may steadily monitor the source data store 140 for updates that involve create, update, and delete operations to entries in the source data store 140. The update component 128 determines if a create, update, or delete operation involving a previously copied entry affects an attribute that was part of the initial selection process by the selection component 122 and/or affects an attribute that was part of the fractional group of attributes then copied to the target data store 150. Any such change may cause the update component 128 to determine if the change may necessitate the removal of the entry from the target data store 150 or some other action. The update component 128 may also monitor the source data store 140 for create, update, and delete operations to entries that have not previously been replicated. If the role attribute for an entry not previously copied to the target data store 150 is changed to customer service representative, that entry will then need to be copied. The update component 128 dynamically monitors create, update, and delete operations to entries in the source data store 140 and specifically focuses on changes to attributes relevant to the selection component 122.

In an embodiment, the update component 128 may periodically delete all entries from the target data store 150 previously copied from the source data store 140. The update component 128 may then activate the full process described earlier of the selection component 122 and the copying component 124 performing conditional and fractional selection and copying of entries to the target data store 150. This process is not an update per se, rather a complete deletion of previously copied entries followed by the full comprehensive selection and copying process described in detail earlier. This process may take place on a periodic basis, for example. This process may alternatively be performed on a near real time basis upon the detection of new entry satisfying the predefined condition(s) for replication or upon the detection of an existing entry that did not previously satisfy the predefined condition(s) now satisfying the predefined condition(s). A communications service provider or other organization may only choose to perform this process less frequently than on the described near real time basis if heuristic and empirical data provide reasonable assurance that there is not statistically significant risk of leaving an entry in the target data store 150 for a significant period of time after that entry has undergone an attribute change necessitating its removal from the target data store 150.

The base transceiver station 180 may be any of a cellular wireless base station, for example a Code Division Multiple Access (CDMA), Global System for Mobile Communications (GSM), Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 180, in an embodiment a plurality of base transceiver stations 180 may be existent and in operation.

The network 190 promotes communication between the components of the system 100. The network 190 may be any communication network including a public data network (PDN), a public switched telephone network (PSTN), a private network, and/or a combination thereof.

The components comprising the replication application 120 have been described herein as executing on the replication server 110. In an embodiment, the components of the replication application 120 may be distributed across multiple separate instances of the replication server 110 that may be a cluster of computers or a server farm. The actions taken by components comprising the replication application 120 may be functionally coupled in a loose manner, commonly compiled, or may be compiled in another manner involving a different level of common operation and compilation.

Figure 2:
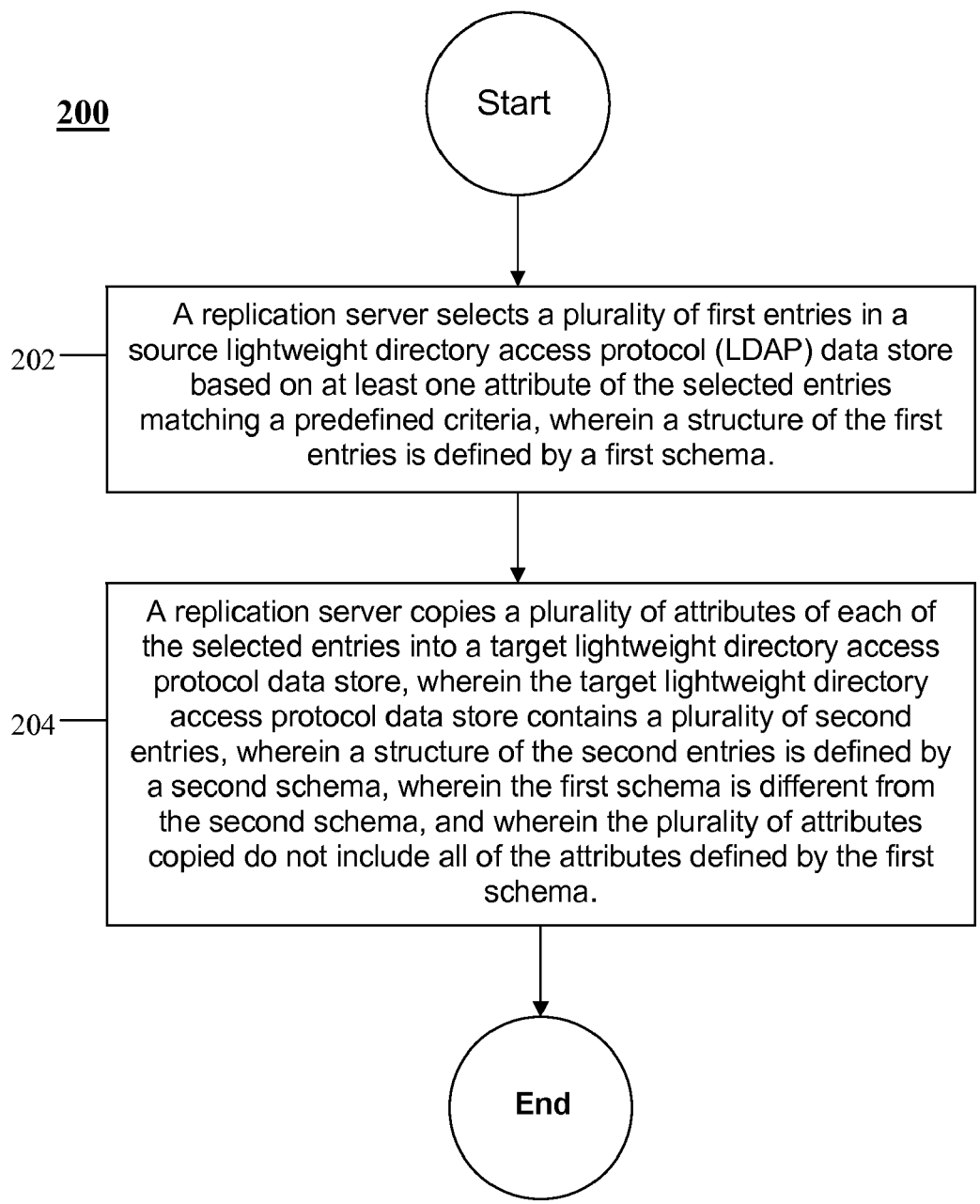
FIG. 2 is a flow chart illustrating a method according to an embodiment of the disclosure.

Turning now to FIG. 2, a computer implemented method 200 promoting enhanced customer support is provided. Beginning at block 202, the replication server 110 selects a plurality of first entries in a source lightweight directory access protocol data store based on at least one attribute of the selected entries matching predefined a criterion, wherein a structure of the first entries is defined by a first schema. It is understood that a subset of the entries stored in the source lightweight directory access protocol data store are selected.

At block 204, the replication server 110 copies a plurality of attributes of each of the selected entries into a target lightweight directory access protocol data store 150, wherein the target lightweight directory access protocol data store 150 contains a plurality of second entries, wherein a structure of the second entries is defined by a second schema, wherein the first schema is different from the second schema, wherein the plurality of attributes copied do not include all of the attributes defined by the first schema, and wherein the actions herein are performed in the context of providing enhanced customer support. The attributes copied to the target data store 150 comprise a fraction of the total attributes of the selected entries. In some contexts, this may be referred to as "fractional data store replication."

Figure 3:
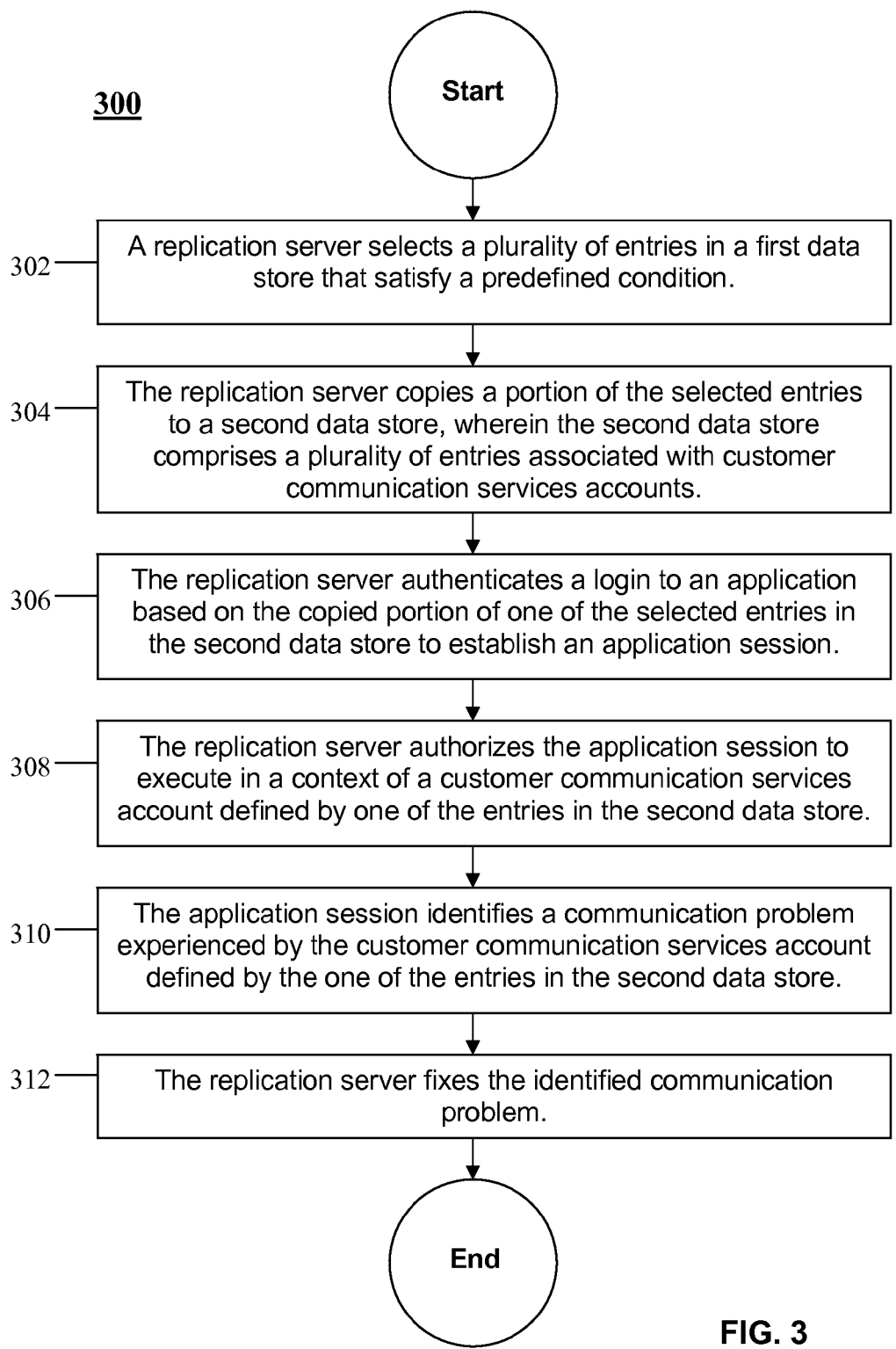
FIG. 3 is a flow chart illustrating another method according to an embodiment of the disclosure.

Turning now to FIG. 3, a computer implemented method 300 is provided. Beginning at block 302, the replication server 110 selects a plurality of entries in the source data store 140 that satisfy a predefined condition.

At block 304, the replication server 110 copies a portion or replicates a fraction of the selected entries to the target data store 150, wherein the target data store 150 comprises a plurality of entries associated with customer communication services accounts. At block 306, the replication server 110 authenticates a login to an application based on the copied portion of one of the selected entries in the target data store 150 to establish an application session.

At block 308, the replication server 110 authorizes the application session to execute in a context of a customer communication services account defined by one of the entries in the target data store 150. At block 310, the application session identifies a communication problem experienced by the customer communication services account defined by the one of the entries in the target data store 150. At block 312, the employee client device 160 fixes the identified communication problem.

In an embodiment, the method 300 may periodically delete the portions of the copied entries from the target data store 150, periodically select a plurality of entries in the source data store 140 that satisfy the predefined condition (substantially repeating the processing of block 302), and periodically copy a portion of the selected entries to the target data store 150 (substantially repeating the processing of block 304). By this process of periodically deleting the portions of the copied entries from the target data store 150, the portions of copied entries are refreshed and kept current in the target data store 150. Changes to entries in the source data store 140 which, as a result of the change, now qualify for copying to the target data store 150 are copied over and changes to entries in the source data store 140 which, as a result of the change, disqualify the entries for copying to the target data store 150 are removed from the target data store 150. In different embodiments, different periods of periodicity may be employed. For example, the period may be about daily, about weekly, or some other period of time effective to balance between processing overhead and keeping the portions of entries copied to the target data store 150 refreshed.

Alternatively, after performing the processing of blocks 302, 304, and 306—for example on start up of the replication application 120, a trigger may be defined for the source data store 140 such that a change to an entry in the source data store 140 causes the entry to be evaluated as a candidate for partial replication to the target data store 150. When the entry is determined to satisfy the predefined condition, the replication server 110 copies a portion of the subject entry to the target data store 150. Likewise, when the entry is determined to have been previously copied into the target data store 150 and the subject change disqualifies the subject entry from being copied into the target data store 150, the portion of the subject entry is removed from the target data store 150.

Figure 4:
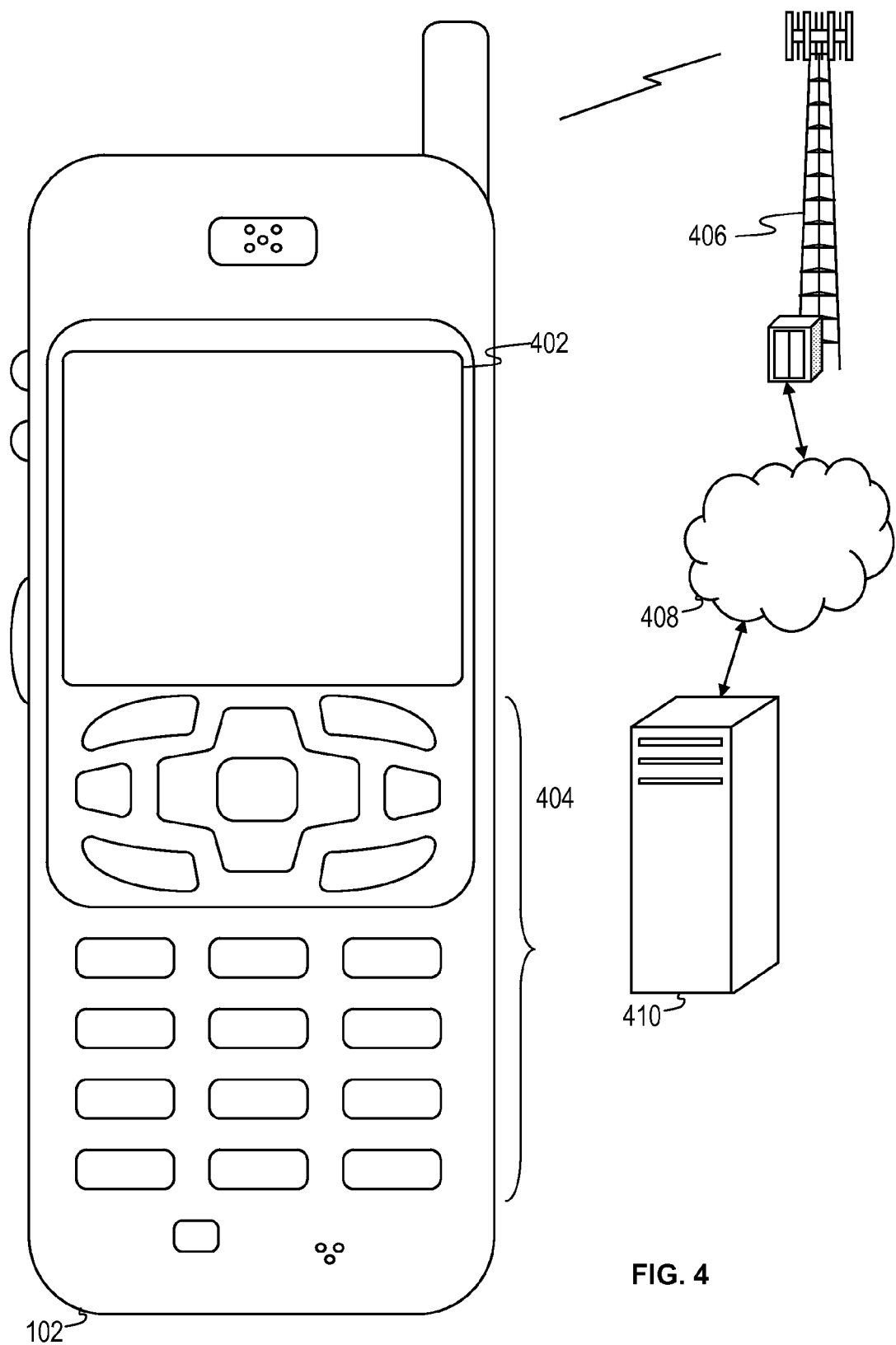
FIG. 4 is an illustration of a mobile device according to an embodiment of the disclosure.

FIG. 4 shows a wireless communications system including a mobile device 102. FIG. 4 depicts the mobile device 102, which is operable for implementing aspects of the present disclosure, but the present disclosure should not be limited to these implementations. The mobile device 102 may in some embodiments exemplify the customer client device 172 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
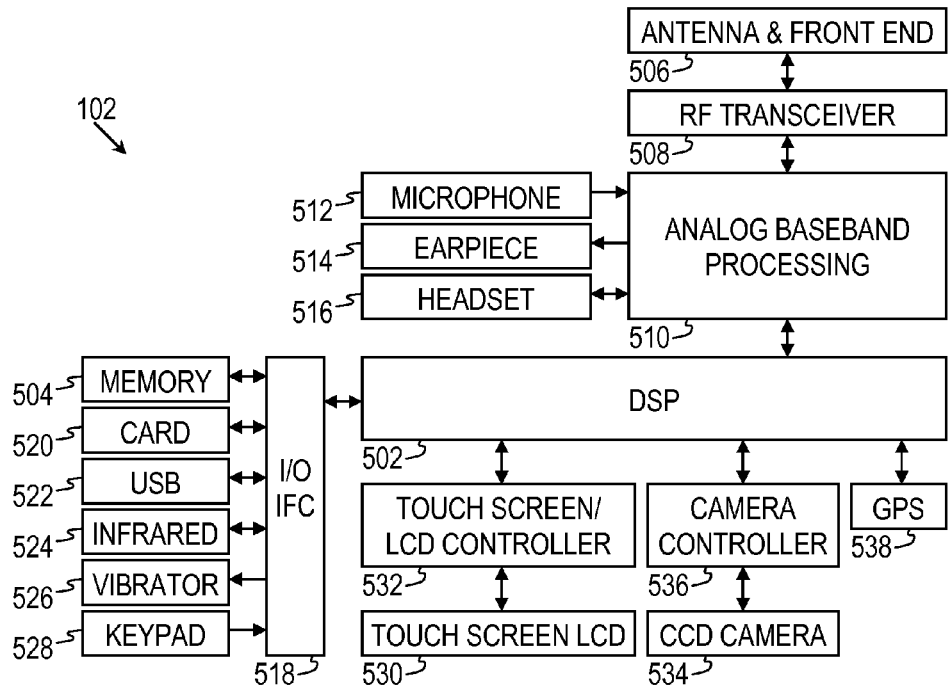
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
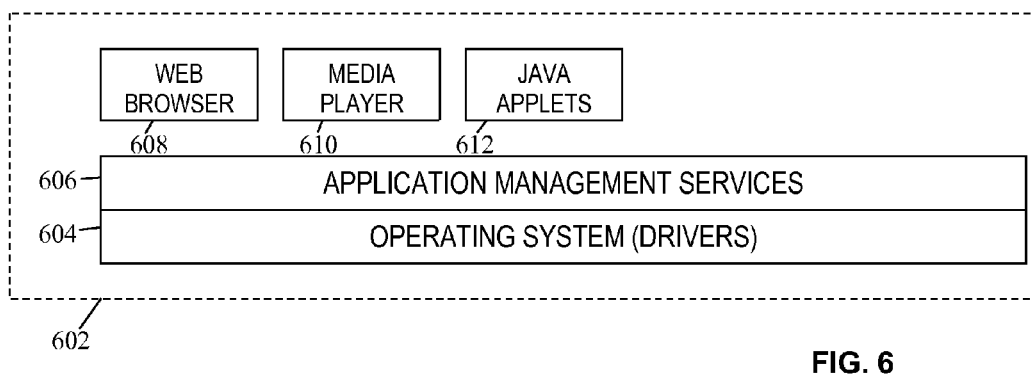
FIG. 6 is a block diagram of a software configuration for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
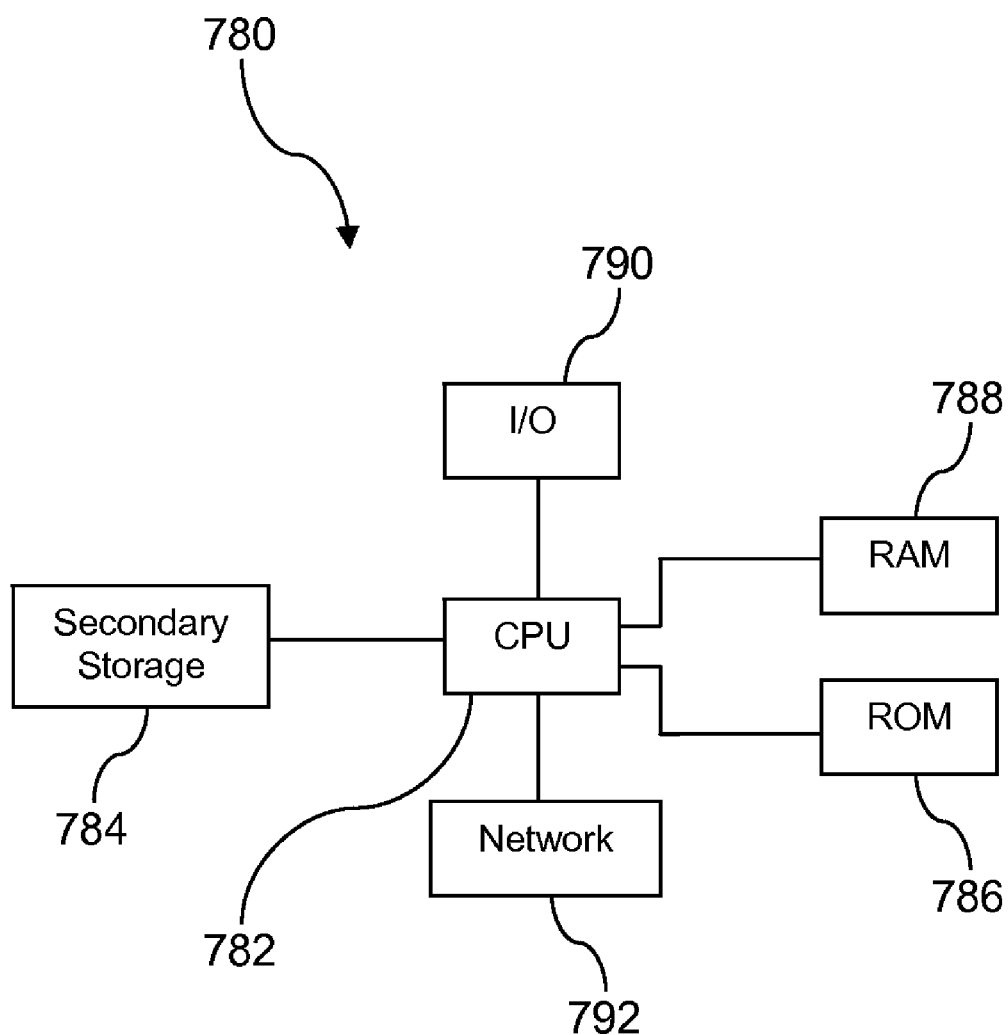
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer implemented method for providing enhanced customer support, comprising:
    selecting a plurality of first entries in a source lightweight directory access protocol (LDAP) data store based solely on a predefined criteria, wherein the predefined criteria defines that an employee role has a customer service representative value, and wherein a structure of the first entries is defined by a first schema;
    copying a plurality of attributes of each of the selected entries into a target lightweight directory access protocol data store, wherein the target lightweight directory access protocol data store contains a plurality of second entries associated with customers of a company, wherein a structure of the second entries is defined by a second schema, wherein the first schema is different from the second schema, and wherein the plurality of attributes copied do not include all of the attributes defined by the first schema;
    authenticating at least one employee of the company associated with one of the selected entries in a customer's context in the target lightweight directory access protocol data store;
    subsequent to the authenticating, mimicking an application or service problem experienced by the customer; and
    deleting a copied entry associated with one of the selected entries from the target lightweight directory access protocol data store when the employee role of the one of the selected entries is changed from a customer service representative role to a different role.

2. The method of claim 1, wherein not all of the first entries and the attributes of the first entries are copied into the target lightweight directory access protocol data store and wherein less than five attributes are copied from each of the selected entries into the target lightweight directory access protocol data store.

3. The method of claim 1, further comprising updating an attribute of one of the selected first entries, wherein the attribute is one of the plurality of attributes copied into the target lightweight directory protocol data store and copying the updated attribute into the target lightweight directory protocol data store.

4. The method of claim 1, further comprising updating an attribute of one of the selected first entries, wherein the attribute is not one of the plurality of attributes copied into the target lightweight directory protocol data store and not copying the updated attribute into the target lightweight directory protocol data store.

5. The method of claim 1, wherein selecting the plurality of first entries in the source lightweight directory access protocol (LDAP) data store is also based on a region of the selected entries having a particular region value.

6. A system, comprising:
    a computer;
    a memory;
    a first lightweight directory access protocol (LDAP) data store;
    a second lightweight directory access protocol data store; and
    an application stored in the memory that, when executed by the computer,
        selects a plurality of first entries in the first lightweight directory access protocol data store based solely on a predefined criteria, wherein the predefined criteria is that an employee role has a customer service representative value, and wherein a structure of the first entries is defined by a first schema, and
        copies a plurality of attributes of each of the selected entries into the second lightweight directory access protocol data store, wherein the second lightweight directory access protocol data store contains a plurality of second entries associated with customers of a company, wherein a structure of the second entries is defined by a second schema, wherein the first schema is different from the second schema, and wherein the plurality of attributes copied do not include all of the attributes defined by the first schema, authenticates at least one employee of the company associated with one of the selected entities in a customer's context in the second lightweight directory access protocol data store, subsequent to authentication, mimics an application or service problem experienced by the customer; and deletes a copied entry associated with one of the selected entries from the second lightweight directory access protocol data store when the employee role of the one of the selected entries is changed from a customer service representative role to a different role.

7. The system of claim 6, wherein the authentication information comprises a userid attribute and a password attribute.

8. A computer implemented method, comprising:

selecting a plurality of entries in a first data store that satisfy a predefined condition;

copying a portion of the selected entries to a second data store, wherein the second data store comprises a plurality of entries associated with customer communication services accounts;

authenticating a login to an application based on the copied portion of one of the selected entries in the second data store to establish an application session;

authorizing the application session to execute in a context of a customer communication services account defined by one of the entries in the second data store;

the application session identifying a communication problem experienced by the customer communication services account defined by the one of the entries in the second data store;

fixing the identified communication problem; and changing a role attribute of one of the selected entries from a customer service representative role to a different role, wherein the predefined condition is that the selected entries comprise a role attribute having a value of customer service representative, and deleting the copied entry associated with the one of the selected entries from the second data store.

9. The method of claim 8, wherein the first data store is a first lightweight directory access protocol (LDAP) data store and the second data store is a second lightweight directory access protocol data store.

10. The method of claim 8, wherein the copied portion of selected entries comprises authentication information.

11. The method of claim 10, wherein the authentication information comprises a userid attribute and a password attribute.

12. The method of claim 8, further comprising updating an attribute of one of the selected entries, wherein the attribute is part of the portion of the selected entries copied into the second data store, and copying the updated attribute into the second data store.

13. The method of claim 8, further comprising updating an attribute of one of the selected entries, wherein the attribute is not part of the portion of the selected entries copied into the second data store, and not copying the updated attribute into the second data store.

14. The method of claim 8, further comprising:

periodically deleting the copied portion of the selected entries from the second data store;

periodically selecting a plurality of entries in the first data store that satisfy the predefined condition; and periodically copying the portion of the selected entries to the second data store.

15. The method of claim 8, further comprising:

selecting an entry in the first data store when the entry is changed to satisfy the predefined condition; and copying a portion of the entry to the second data store; and removing the portion of the entry from the second data store when the entry in the first data store is changed to no longer satisfy the predefined condition.

* * * * *